Jan. 13, 1959     J. W. GRAY     2,869,006
PHASE SENSITIVE RECTIFIER
Filed June 21, 1956
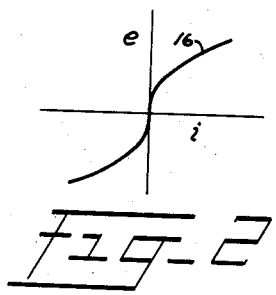
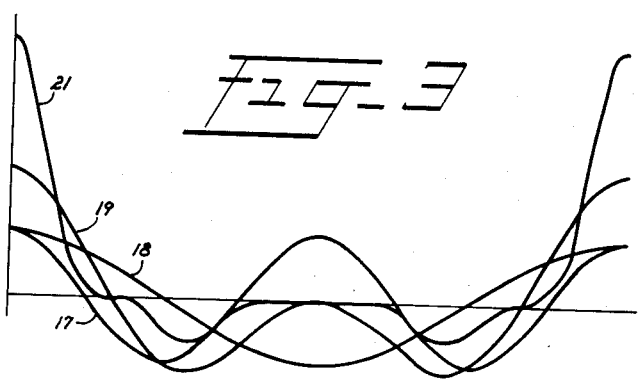
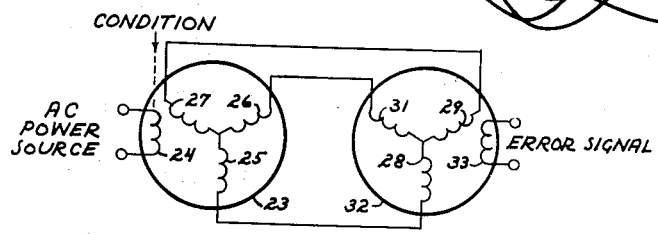
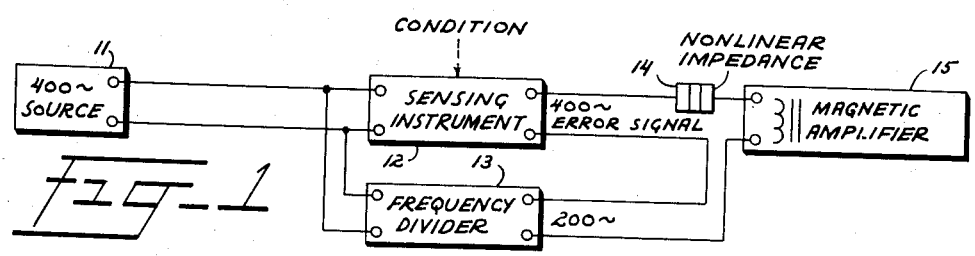
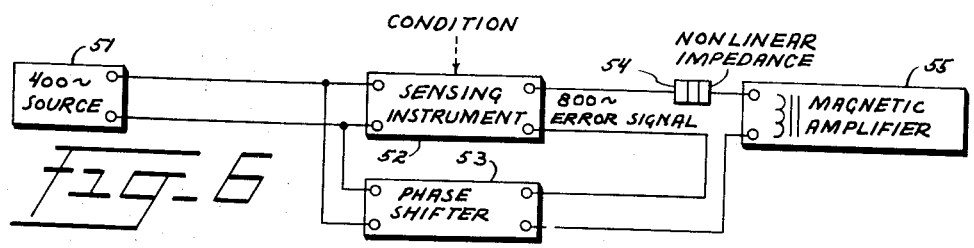
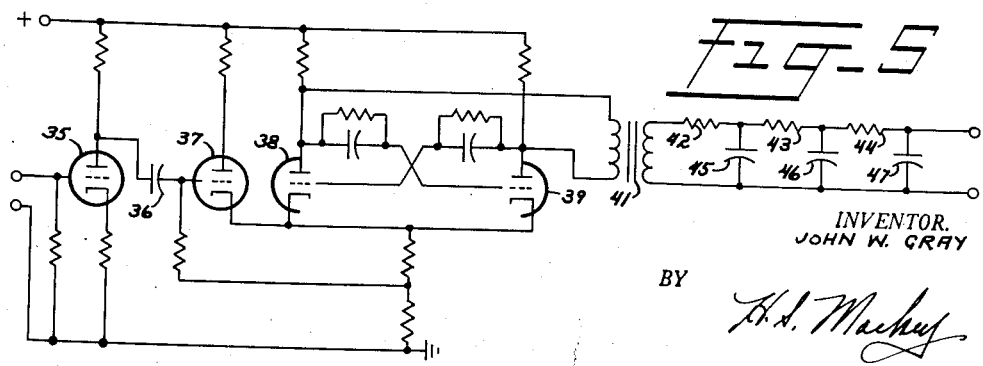
INVENTOR.
JOHN W. GRAY
BY
ATTORNEY

United States Patent Office 2,869,006
Patented Jan. 13, 1959

2,869,006

PHASE SENSITIVE RECTIFIER

John W. Gray, Pleasantville, N. Y., assignor to General Precision Laboratory Incorporated, a corporation of New York Application June 21, 1956, Serial No. 592,841

11 Claims. (Cl. 307—149)

This invention relates to a phase sensitive rectifying system.

A phase sensitive rectifier is one which is capable of delivering a direct current output the polarity and magnitude of which are dependent upon the phase and magnitude of an alternating current input. Such a rectifier finds wide application in modern electronic control equipment. Many instruments for sensing conditions such as position, direction, temperature, pressure, and the like, are excited with an alternarting current and have induced in them an alternating voltage the magnitude and phase of which depend upon the deviation from a reference quantity of the condition being sensed. Deviations in opposite directions cause voltages of opposite phase to be induced. The induced voltage may be of the same frequency as that of the excitation, as in the case of the usual synchro, or may be of twice the frequency, as in the flux gate compass and some permanent magnet synchros. In all cases the induced voltage, or error voltage, is coherent with the excitation.

Error signals derived as above described are usually too feeble to drive control apparatus directly and must therefore be amplified. Magnetic amplifiers have met with wide favor recently because of their simplicity and their ability to control large amounts of power. However, they require a direct current input signal of reversible polarity. In order to use a reversible phase alternating current error signal to drive a magnetic amplifier, this signal must first be converted to a reversible polarity direct current signal. In the prior art, this conversion has been accomplished in a number of ways such as by means of crystal diodes, cathode gated differential amplifiers, and by grid controlled rectifiers. The disadvantages of such systems is that the zero point must be adjusted frequently, since the characteristics of tubes and crystals vary with age and temperature and from unit to unit.

It is an object of this invention to provide apparatus for converting a reversible phase alternating current signal to a reversible polarity direct current signal, which will consistently deliver zero output in response to zero input.

A more specific object is to devise apparatus for driving a magnetic amplifier from an alternating current signal.

In accordance with the invention, the waveform of the error signal voltage is distorted so that the peak values of one polarity are greater than the peak values of the opposite polarity. The polarity of the greater peaks reverses with phase reversals of the error signal. The distorted signal voltage is connected in series with a nonlinear impedance so that the resulting current has a direct current component. This current may be used to control a load such as a magnetic amplifier.

For a full understanding of the invention reference may be made to the accompanying drawing in which:

Figure 1 is a block diagram of one embodiment of the invention;

Figure 2 is a curve showing the characteristics of the nonlinear impedance used in the invention;

Figure 3 is a group of curves useful in explaining the operation;

Figure 4 is a schematic diagram illustrating a sensing instrument which may be used in the embodiment of Fig. 1;

Figure 5 is a schematic diagram of a frequency divider which may be used in the embodiment of Fig. 1; and Figure 6 is a block diagram of another embodiment of the invention.

Referring first to Fig. 1, there is shown a source 11 of alternating current power illustrated as having a frequency of 400 cycles. Connected to the source 11 is a sensing instrument 12. This instrument may have any of various configurations provided that it yield an error signal of the same frequency as its excitation and the magnitude and phase of which are indicative of the magnitude and sense of the condition. A frequency divider 13 is also connected to the source 11. The frequency divider may also be any of several different kinds, it only being necessary that the output frequency be one half that of the input and that the phase of the output be such that each peak value approximately coincides in time with a peak value of the error signal.

The error signal and the output of the frequency divider are connected in series with a nonlinear impedance 14 and a load device 15, such as a magnetic amplifier. The impedance 14 has a voltage-current characteristic of the form shown by the curve 16 of Fig. 2. This curve is of the general form $i = ke^a$ where $k$ is a constant and $a$ is an odd integer greater than one, such as 3 or 5. It is not necessary that the characteristic follow such a curve precisely, provided that the characteristic has this general form and has inverse symmetry with respect to the origin. The nonlinear impedance 14 may, for example, be a refractory conductive material bonded by a clay or ceramic mixture such as that sold by the General Electric Company under the name "Thyrite."

The operation can be readily understood by reference to Fig. 3. In this figure, the curve 17 represents the waveform of the error signal from the instrument 12. The curve 18 represents the ouput of the frequency divider 13. These voltages are connected in series so that their sum has the form indicated by the curve 19. If the curves 17 and 18 are both sine waves, the curve 19 will have no direct current component since it bounds equal areas above and below the zero axis. However, the positive peaks of the curve 19 are greater than the negative peaks. When this voltage is impressed across the impedance 14, the resulting current will have a direct current component as indicated by the curve 21, which bounds a greater area on the positive side than on the negative. This current can, therefore, be used to control the magnetic amplifier 15. It will be noted that if the phase of the error signal shown by curve 17 be reversed while the phase of the curve 18 remains the same, the negative peaks of their sum will be greater than the positive peaks, thus causing the direct current component of the current through impedance 14 to reverse its polarity.

Referring now to Fig. 4, there is shown one form which the sensing instrument 12 may take. A synchro transmitter 23 has its rotor coil 24 connected to the power source. The rotor coil 24 is mechanically connected to be rotated as the condition being sensed varies. The stator windings 25, 26 and 27 are connected to the stator windings 28, 29 and 31 of a synchro control transformer 32. The rotor winding 33 of the control transformer will have induced in it an alternating voltage, the magnitude and phase of which are indicative of the relative angular position of windings 33 and 24.

Fig. 5 illustrates one form which the frequency divider 13 of Fig. 1 may take. The input is connected to a triode 35 which is operated as an overdriven amplifier. The voltage at the plate of triode 35 will, therefore, be approximately a squarewave with a steeply rising wave front. The anode of triode 35 is coupled by means of a capacitor 36 to the grid of a cathode follower 37. A pair of triodes 38 and 39 are connected in a conventional multivibrator circuit and are triggered by triode 37 through their common cathode connection. The output of the multivibrator is a square wave of one half the frequency of the input to the triode 35. The output of the frequency divider 13 should be free of second harmonic, since a second harmonic would act as an erroneous error signal. The second harmonic is avoided in the output by the push-pull connection to the anodes of tubes 38 and 39 through the transformer 41. The secondary of transformer 41 is connected to successive integrating circuits comprising resistors 42, 43 and 44 and capacitors 45, 46 and 47. These integrator stages reshape the square wave to a form approximating a sine wave and also shift its phase. The number of stages and the time constants of each are selected so that the peaks of the output wave approximately coincide in time with peaks of the error signal, as shown by curves 17 and 18 of Fig. 3.

Referring now to Fig. 6, there is shown a source of alternating current power 51 connected to a sensing instrument 52. The instrument 52 may, for example, comprise a flux gate compass, and its follow-up synchro or a configuration including permanent magnet synchros. Such instruments produce an error signal having twice the frequency of their excitation. A phase shifter 53 is also connected to the source 51 and its output is connected in series with the error signal from instrument 52, a non-linear impedance 54, and a load device 55 such as a magnetic amplifier. The sensing instrument 52 doubles the frequency of the source 51 so that no frequency divider is required. It is only necessary to adjust the phase of the source so that the peaks of the error signal and the output of the phase shifter coincide. The operation of the device is identical to that explained in connection with Fig. 3.

The invention has been described with respect to two specific embodiments. However, many modifications may be made within the scope of the invention. For example, the invention may be used to control devices other than magnetic amplifiers such as the field windings of motors or generators. A single frequency divider could be used for several phase sensitive detector circuits. The frequency of the source obviously need not be 400 cycles but could be any other desired frequency. The frequency divider 13 of Fig. 1 could comprise a rotary generator on the same shaft as that providing the source 11, or could comprise a motor generator set. Many other modifications will occur to those skilled in the art.

What is claimed is:

1. Apparatus for deriving a current having a direct current component the magnitude and the polarity reversals of which correspond to the magnitude and the phase reversals of an alternating voltage signal comprising, means for distorting the waveform of said signal so that the magnitude of the peaks of one polarity is greater than the magnitude of the peaks of opposite polarity, the polarity of the greater peaks reversing with phase reversal of said signal, an impedance having a nonlinear voltage-current characteristic, and means for connecting said signal of distorted waveform, said impedance, and a load circuit in series.

2. Apparatus for supplying a load circuit with a current having a direct current component of variable magnitude and reversible polarity from an alternating voltage signal of variable magnitude and reversible phase comprising, an alternating voltage source of one half of the frequency of said signal, each peak of which approximately coincides in time with a peak of said signal, an impedance having a nonlinear voltage-current characteristic, and means for connecting said signal, said alternating voltage source, and said nonlinear impedance in series with said load circuit.

3. Control apparatus comprising a first source of alternating voltage the magnitude and phase of which are indicative of the magnitude and sense of a condition, a second source of alternating voltage of one half the frequency of said first source and each peak value of which coincides approximately in time with a peak value of said first source, a nonlinear impedance element having a voltage-current characteristic corresponding qualitatively to the equation $i = ke^a$, where $k$ is a constant and $a$ is an odd integer greater than one, and means for connecting said first source, said second source, and said impedance in series with a load device.

4. Control apparatus comprising, a source of alternating current power, an instrument excited by said source for generating an alternating signal voltage the magnitude and phase of which are indicative of the magnitude and sense of a condition, means for deriving an alternating voltage the frequency of which is one half that of said signal voltage and each peak magnitude of which approximately coincides in time with a peak magnitude of said signal voltage, an impedance having a nonlinear voltage-current characteristic, and means for connecting said signal voltage, said derived voltage and said nonlinear impedance in series with a load device.

5. Control apparatus comprising, a source of alternating current power, an instrument excited by said source for generating an alternating signal voltage, coherent with said source, the magnitude and phase of which are indicative of the magnitude and sense of a condition, means for deriving from said source an alternating voltage the frequency of which is one half that of said signal voltage and each peak value of which approximately coincides in time with a peak value of said signal voltage, a nonlinear resistor having a voltage-current characteristic corresponding qualitatively to the expression $i = ke^a$, where $k$ is a constant and $a$ is an odd integer greater than unity, a load device responsive to direct current, and means for connecting in series said signal voltage, said derived voltage, said resistor and said load device.

6. Control apparatus comprising, a source of alternating current power, an instrument excited by said source for generating a first alternating voltage the frequency of which is equal to that of said source and the magnitude and phase of which are indicative of the magnitude and sense of a condition, means for deriving a second alternating voltage the frequency of which is equal to one half that of said source and each peak magnitude of which approximately coincides in time with a peak magnitude of said first voltage, an impedance having a nonlinear voltage-current characteristic, and means for connecting said first voltage, said second voltage and said impedance in series with a load device.

7. Apparatus according to claim 6 in which said nonlinear impedance has a voltage-current characteristic corresponding qualitatively to the expression $i = ke^a$, where $k$ is a constant and $a$ is an odd integer greater than unity.

8. Control apparatus comprising, a source of alternating current power, an instrument excited by said source for generating a first alternating voltage the frequency of which is equal to twice that of said source and the magnitude and phase of which are indicative of the magnitude and sense of a condition, means for deriving a second alternating voltage the frequency of which is equal to that of said source, means for shifting the phase of said second voltage so that each peak value thereof coincides approximately in time with a peak value of said first voltage, an impedance having a nonlinear voltage-current characteristic, and means for connecting said first voltage, said second voltage and said impedance in series with a load device.

9. Apparatus according to claim 8 in which said nonlinear impedance has a voltage-current characteristic corresponding qualitatively to the expression $i = ke^a$, where $k$ is a constant and $a$ is an odd integer greater than unity.

10. Apparatus for deriving a current having a direct current component the magnitude of which depends upon the magnitude of an alternating voltage signal and the polarity of which reverses whenever the phase of said signal reverses, comprising, means for distorting the waveform of said signal so that the magnitude of the peaks of one polarity is greater than the magnitude of the peaks of opposite polarity, the polarity of the greater peaks reversing with phase reversal of said signal, an impedance having a nonlinear voltage-current characteristic, and means for connecting said signal of distorted waveform, said impedance, and a load circuit in series.

11. Control apparatus comprising, a first source of alternating voltage having either a first phase or a second phase depending upon the sense of a condition, said second phase being displaced one hundred and eighty degrees from said first phase, the magnitude of said alternating voltage being indicative of the magnitude of said condition, a second source of alternating voltage of one half the frequency of said first source and each peak value of which coincides approximately in time with a peak value of the voltage of said first source, an impedance having a nonlinear voltage-current characteristic corresponding qualitatively to the equation $i=ke^a$, where $k$ is a constant and $a$ is an odd integer greater than one, and means for connecting said first source, said second source, and said impedance in series with a load device.

References Cited in the file of this patent

UNITED STATES PATENTS

| | | |
|---|---|---|
| 1,857,160 | McEachron | May 10, 1932 |
| 2,541,093 | Page | Feb. 13, 1951 |
| 2,696,582 | Willard | Dec. 7, 1954 |